(12) United States Patent
Okabe et al.

(10) Patent No.: US 6,887,532 B2
(45) Date of Patent: May 3, 2005

(54) LIQUID CRYSTAL COMPOSITION AND LIQUID CRYSTAL DISPLAY ELEMENT

(75) Inventors: Eiji Okabe, Ichihara (JP); Yoshitaka Tomi, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 12 days.

(21) Appl. No.: 10/726,292

(22) Filed: Dec. 2, 2003

(65) Prior Publication Data

US 2004/0108488 A1 Jun. 10, 2004

(30) Foreign Application Priority Data

Dec. 4, 2002 (JP) ...................................... 2002-352262

(51) Int. Cl.$^7$ .................. C09K 19/30; C09K 19/12; C09K 19/20; C09K 19/34
(52) U.S. Cl. ............. 428/1.1; 252/299.61; 252/299.63; 252/299.66; 252/299.67
(58) Field of Search .................. 428/1.1; 252/299.61, 252/299.63, 299.66, 299.67

(56) References Cited

U.S. PATENT DOCUMENTS

| | | | |
|---|---|---|---|
| 5,961,881 A | 10/1999 | Andou et al. | 252/299.63 |
| 6,007,740 A | 12/1999 | Andou et al. | 252/299.63 |
| 6,187,223 B1 * | 2/2001 | Andou et al. | 252/299.63 |
| 6,315,922 B1 | 11/2001 | Takeshita et al. | 252/299.61 |
| 6,325,949 B1 | 12/2001 | Takeshita et al. | 252/299.63 |
| 6,497,929 B1 | 12/2002 | Miyairi et al. | 428/1.1 |
| 6,572,938 B2 * | 6/2003 | Yanai et al. | 428/1.1 |
| 6,759,102 B2 * | 7/2004 | Murashiro et al. | 428/1.1 |

FOREIGN PATENT DOCUMENTS

WO    WO 01/46336 A2    6/2001

* cited by examiner

Primary Examiner—Shean C. Wu
(74) Attorney, Agent, or Firm—Hogan & Hartson, L.L.P.

(57) ABSTRACT

A liquid crystal composition including three components, optionally four components, selected from the compounds (1-1) to (3-3) is provided. The composition has plural characteristics, i.e., a wide temperature range of a nematic phase, a low viscosity, a suitable optical anisotropy, and a large dielectric anisotropy, in a properly balanced manner. The invention further provides a liquid crystal display element including the composition.

15 Claims, No Drawings

LIQUID CRYSTAL COMPOSITION AND LIQUID CRYSTAL DISPLAY ELEMENT

BACKGROUND OF THE INVENTION

1. Field of the Invention

The present invention relates to a liquid crystal composition suitable for use mainly in an active matrix (AM) element, and an AM element comprising the composition.

2. Description of the Related Art

A liquid crystal display element is classified, based on an operating mode of liquid crystals, into phase change (PC), twisted nematic (TN), super twisted nematic (STN), electrically controlled birefringence (ECB), optically compensated bend (OCB), in-plane switching (IPS), vertical alignment (VA) and the like. It is classified into passive matrix (PM) and active matrix (AM) based on a driving mode. PM is further classified into static, multiplex and the like, and AM is classified into thin film transistor (TFT), metal insular metal (MIM) and the like. TFT is further classified into amorphous silicon and polycrystal silicon. The latter is classified into a high temperature type and a low temperature type according to a production process. The liquid crystal display element is classified, based on a light source, into a reflection type utilizing natural light, a transmission type utilizing a backlight and a semi-transmission type utilizing both of them.

These elements comprise a liquid crystal composition having suitable characteristics. To improve the general characteristics of the composition can lead to the production of an AM element having good general characteristics. The general characteristics of the composition are related to those of an AM element as summarized in Table 1. The general characteristics of the composition shall be further explained based on an AM element on the market. The temperature range of a nematic phase is related to the temperature range in which the element can be used. The desirable higher limit temperature of a nematic phase is 70° C. or more and the desirable lower limit is −20° C. or less. The viscosity of the composition correlates with the response time of the element. A short response time is desirable for displaying a moving image. Accordingly, the composition desirably has a low viscosity, and a low viscosity at low temperature is more desirable.

TABLE 1

General characteristics of a liquid crystal composition and an AM element

| No. | General Characteristics of the Composition | General Characteristics of an AM Element |
|---|---|---|
| 1 | Wide temperature range of a nematic phase | Available in wide temperature range |
| 2 | Low in viscosity[1] | Short in response time |
| 3 | Suitable optical anisotropy | High in contrast ratio |
| 4 | Large in positive or negative dielectric anisotropy[2] | Low in operating electric voltage |
| 5 | High in specific resistance | High in voltage holding ratio and high contrast ratio |

[1] The liquid crystal composition can be injected into a cell in a short time.
[2] The liquid crystal composition contributes to high aperture ratio in an IPS element.

The optical anisotropy of the composition correlates with the contrast ratio of the element. To attain a maximum contrast ratio of the element, a product (Δn·d) of the optical anisotropy (Δn) of the composition and the cell gap (d) should be designed to be approximately 0.45 μm. Accordingly, the optical anisotropy of the composition is in the range of 0.08 to 0.12. A large dielectric anisotropy of the composition contributes to low operating electric voltage of the element. Accordingly, a large dielectric anisotropy is desirable. High specific resistance of the composition contributes to a high voltage holding ratio and a high contrast ratio of the element. Accordingly, a liquid crystal composition having a high specific resistance in the initial stage is desirable. Further, it is desirable that the composition still has a high specific resistance even after a long-term use.

It is desirable that the composition suitable for an AM element of a TN mode has a high specific resistance. In contrast, the composition suitable for an AM element of an IPS mode may have a low specific resistance in comparison to the composition suitable for an AM element of a TN mode. This is because the AM element of an IPS mode which comprises the composition having a low specific resistance has a high voltage holding ratio. This is explained in IDW'97 Proceedings of The Fourth International Display Workshops p171–p174. The composition suitable for an AM element of an IPS mode may comprise a compound having cyano at the end of the molecule.

In an AM element of an IPS mode, a large dielectric anisotropy of the composition contributes to high aperture ratio of the element. Accordingly, a composition having a low viscosity and a large dielectric anisotropy is specifically desired for the element so that it displays an animated cartoon at a high aperture ratio. The conventional compositions are disclosed in the following patent documents; JP10-204016A/1998(U.S. Pat. No. 6,007,740, JP10-204436A/1998(U.S. Pat. No. 5,961,881), JP2001-003051A (U.S. Pat. No. 6,325,949), JP2001-003053A (U.S. Pat. No. 6,315,922), JP2001-123170A(U.S. Pat. No. 6,497,929), and WO01/046336A.

SUMMARY OF THE INVENTION

Summary of the invention includes the following A and B.

A. A liquid crystal composition comprising at least one compound selected from the group of compounds represented by formulas (1-1), (1-2), and (1-3) as a first component, at least one compound selected from the group of compounds represented by formula (2) as a second component, and at least one compound selected from the group of compounds represented by formulas (3-1), (3-2), and (3-3) as a third component:

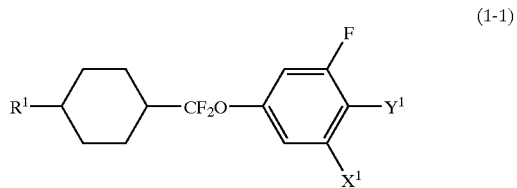

(1-1)

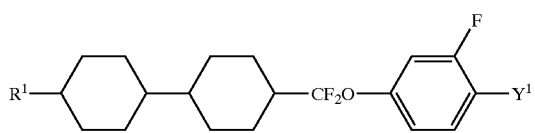

(1-2)

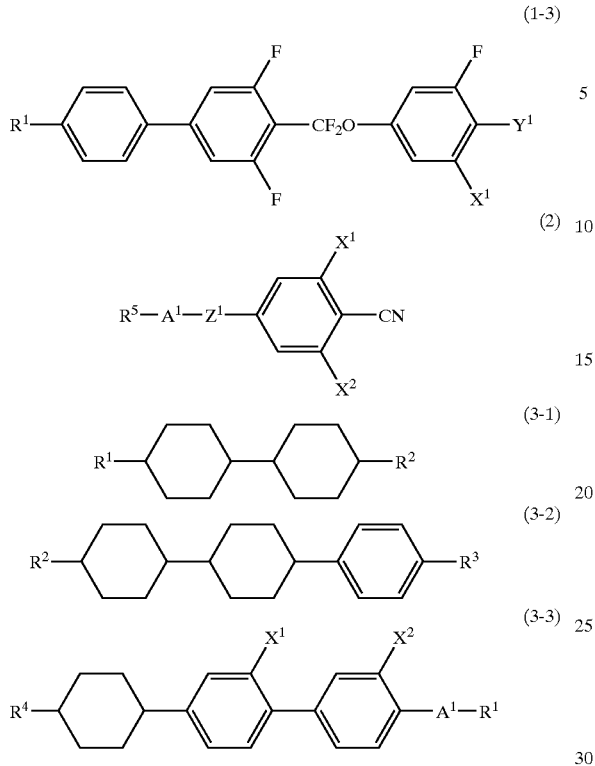

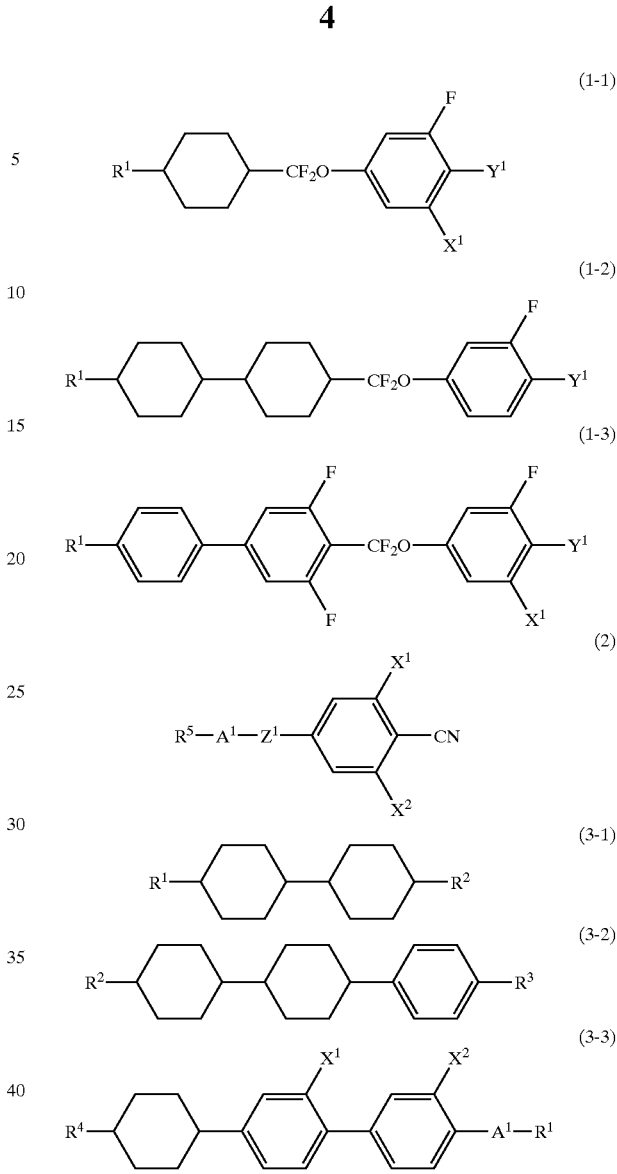

wherein, $R^1$ is alkyl; $R^2$ is alkyl, alkenyl, or alkenyl in which one or more hydrogens are replaced by fluorine; $R^3$ is alkyl or alkoxy; $R^4$ is alkyl or alkoxymethyl; $R^5$ is alkyl or alkenyl; $A^1$ is 1,4-cyclohexylene or 1,4-phenylene; $Z^1$ is a single bond or —COO—; $X^1$ and $X^2$ are independently hydrogen or fluorine; and $Y^1$ is fluorine or —$OCF_3$.

B. A liquid crystal display element comprising the liquid crystal composition described above.

DETAILED DESCRIPTION OF THE INVENTION

An object of the present invention is to provide a liquid crystal composition which can satisfy plural characteristics, i.e., a wide temperature range of a nematic phase, a low viscosity, a suitable optical anisotropy, and a large dielectric anisotropy. Another object is to provide a liquid crystal composition having plural characteristics properly balanced. A further object is to provide a liquid crystal display element comprising such a composition. A still further object is to provide an AM element of an IPS mode which comprises the composition having a low viscosity, an optical anisotropy of 0.08 to 0.12 and a large dielectric anisotropy, and has a high voltage holding ratio.

The following items 1 to 21 constitute the present invention.

1. A liquid crystal composition comprising at least one compound selected from the group of compounds represented by formulas (1-1), (1-2), and (1-3) as a first component, at least one compound selected from the group of compounds represented by formula (2) as a second component, and at least one compound selected from the group of compounds represented by formulas (3-1), (3-2), and (3-3) as a third component:

wherein, $R^1$ is alkyl; $R^2$ is alkyl, alkenyl, or alkenyl in which one or more hydrogens are replaced by fluorine; $R^3$ is alkyl or alkoxy; $R^4$ is alkyl or alkoxymethyl; $R^5$ is alkyl or alkenyl; $A^1$ is 1,4-cyclohexylene or 1,4-phenylene; $Z^1$ is a single bond or —COO—; $X^1$ and $X^2$ are independently hydrogen or fluorine; and $Y^1$ is fluorine or —$OCF_3$.

2. The liquid crystal composition according to item 1, wherein the first component is at least one compound selected from the group of compounds represented by formula (1-1).

3. The liquid crystal composition according to item 1, wherein the first component is at least one compound selected from the group of compounds represented by formula (1-1) and at least one compound selected from the group of compounds represented by formula (1-2).

4. The liquid crystal composition according to item 1, wherein the first component is at least one compound selected from the group of compounds represented by formula (1-1) and at least one compound selected from the group of compounds represented by formula (1-3).

5. The liquid crystal composition according to item 1, wherein the first component is at least one compound selected from the group of compounds represented by formula (1-1), at least one compound selected from the group of compounds represented by formula (1-2), and at least one compound selected from the group of compounds represented by formula (1-3).

6. The liquid crystal composition according to item 1, wherein the first component is at least one compound selected from the group of compounds represented by formula (1-2).

7. The liquid crystal composition according to item 1, wherein the first component is at least one compound selected from the group of compounds represented by formula (1-2) and at least one compound selected from the group of compounds represented by formula (1-3).

8. The liquid crystal composition according to item 1, wherein the first component is at least one compound selected from the group of compounds represented by formula (1-3).

9. The liquid crystal composition according to any one of items 1 to 8 which comprises from 5 to 50% by weight of the first component, from 5 to 40% by weight of the second component, and from 10 to 70% by weight of the third component, each based on the total weight of the composition.

10. The liquid crystal composition according to any one of items 1 to 9 which further comprises at least one compound selected from the group of compounds represented by formulas (4-1), (4-2), (4-3), and (4-4) as a fourth component:

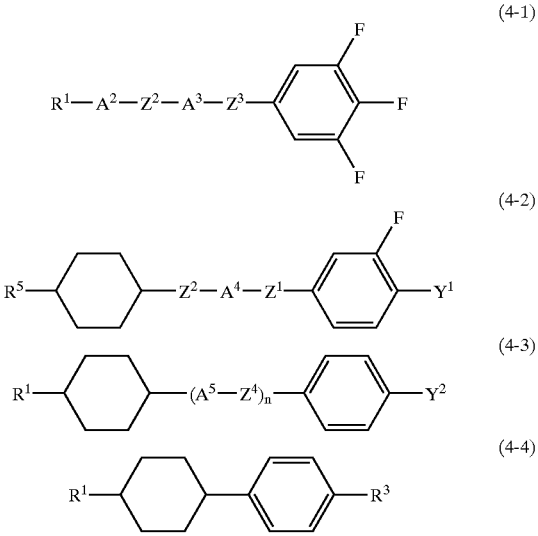

wherein, $R^1$ is alkyl; $R^3$ is alkyl or alkoxy; $R^5$ is alkyl or alkenyl; $A^2$ is 1,4-cyclohexylene or 1,3-dioxane-2,5-diyl; $A^3$ is 1,4-cyclohexylene, 1,4-phenylene, 1,3-dioxane-2,5-diyl, or 3-fluoro-1,4-phenylene; $A^4$ is 1,4-cyclohexylene, 1,4-phenylene, or 3,5-difluoro-1,4-phenylene; $A^5$ is 1,4-cyclohexylene or 3-fluoro-1,4-phenylene; $Z^3$ is a single bond or —COO—; $Z^2$ is a single bond or —(CH$_2$)$_2$—; $Z^3$ is a single bond, —COO—, —(CH$_2$)$_2$—, or —CF$_2$O—; $Z^4$ is a single bond, —COO—, or —(CH$_2$)$_2$—; $Y^1$ is fluorine or —OCF$_3$; $Y^2$ is fluorine, chlorine, or —OCF$_3$; and n is 0 or 1.

11. The liquid crystal composition according to item 10 which comprises from 1 to 50% by weight of the fourth component, based on the total weight of the composition.

12. A liquid crystal display element comprising the liquid crystal composition described in any one of items 1 to 11.

13. The liquid crystal display element according to item 12, wherein the liquid crystal display element is an AM element of an IPS mode.

14. The liquid crystal composition according to any one of items 1 to 8, wherein the third component is at least one compound selected from the group of compounds represented by formula (3-1).

15. The liquid crystal composition according to any one of items 1 to 8, wherein the third component is at least one compound selected from the group of compounds represented by formula (3-1) and at least one compound selected from the group of compounds represented by formula (3-2).

16. The liquid crystal composition according to any one of items 1 to 8, wherein the third component is at least one compound selected from the group of compounds represented by formula (3-1) and at least one compound selected from the group of compounds represented by formula (3-3).

17. The liquid crystal composition according to any one of items 1 to 8, wherein the third component is at least one compound selected from the group of compounds represented by formula (3-1), at least one compound selected from the group of compounds represented by formula (3-2), and at least one compound selected from the group of compounds represented by formula (3-3).

18. The liquid crystal composition according to any one of items 1 to 8, wherein the third component is at least one compound selected from the group of compounds represented by formula (3-2).

19. The liquid crystal composition according to any one of items 1 to 8, wherein the third component is at least one compound selected from the group of compounds represented by formula (3-3).

20. The liquid crystal composition according to any one of items 1 to 8, wherein the third component is at least one compound selected from the group of compounds represented by formula (3-2) and at least one compound selected from the group of compounds represented by formula (3-3).

21. The liquid crystal composition according to any one of items 14 to 20 which comprises from 5 to 50% by weight of the first component, from 5 to 40% by weight of the second component, and from 10 to 70% by weight of the third component, each based on the total weight of the composition.

The terms used in this specification are explained below:
The liquid crystal composition or the liquid crystal display element of the present invention may occasionally be abbreviated to "the composition" or "the element", respectively. A liquid crystal display element is a general term for a liquid crystal display panel and a liquid crystal display module. A main component of a liquid crystal composition is liquid crystalline compounds. The liquid crystalline compound is a general term for a compound having a liquid crystal phase such as a nematic phase, a smectic phase and the like, and a compound having no liquid crystal phase but useful for the composition. At least one compound selected from a group of compounds represented by formula (1) may be abbreviated to "compound (1)". Compounds represented by any other formulas may also be abbreviated in the same manner.

The higher limit temperature of a nematic phase may be abbreviated to "the higher limit temperature". The lower limit temperature of a nematic phase may be abbreviated to "the lower limit temperature". "High in specific resistance" means that the composition has a high specific resistance at the initial stage and even after a long-term use. "High in voltage holding ratio" means that the element has a high voltage holding ratio at the initial stage and even after a long-term use. The characteristics such as an optical anisotropy are explained using the values measured in the same manner as in Examples. The content of a component compound in the composition is expressed in terms of weight percent based on the total weight of the composition.

The composition of the present invention satisfies plural characteristics, i.e., a wide temperature range of a nematic phase, a low viscosity, a suitable optical anisotropy, and a dielectric anisotropy. The composition has plural above characteristics properly balanced. The element of the present invention comprises the composition. An AM element of an IPS mode which comprises the composition having a low viscosity, an optical anisotropy of 0.08 to 0.12 and a large dielectric anisotropy has a high voltage holding ratio.

The composition of the present invention shall be explained in the following order:

First explained is the constitution of components in the composition; second, main characteristics of the component compounds and their main effect on the composition; third, suitable mixing ratios of the compounds with any reasons thereof; fourth, suitable molecular structures of the compounds; fifth, concrete example of the compounds; and sixth, the method of synthesizing them.

The constitution of the components in the composition shall be first explained. There are 49 types of combination of compounds (1-1) to (3-3) being a first component, a second component, and a third component as shown in Table 2, wherein the component compounds in each of types 1 to 49 are indicated by marking a circle. In type 1, for example, compounds (1-1), (1-2), and (3-1) are the components of the composition. These compositions of 49 types can further comprise at least one compound selected from a group of compounds (4-1) to (4-4) being a fourth component.

TABLE 2

Exemplified combination of compounds

| | Compound (1-1) | Compound (1-2) | Compound (1-3) | Compound (2) | Compound (3-1) | Compound (3-2) | Compound (3-3) |
|---|---|---|---|---|---|---|---|
| Type1 | ○ | | | ○ | ○ | | |
| Type2 | ○ | | | ○ | | ○ | |
| Type3 | ○ | | | ○ | | | ○ |
| Type4 | ○ | | | ○ | ○ | ○ | |
| Type5 | ○ | | | ○ | ○ | | ○ |
| Type6 | ○ | | | ○ | | ○ | ○ |
| Type7 | ○ | | | ○ | ○ | ○ | ○ |
| Type8 | | ○ | | ○ | ○ | | |
| Type9 | | ○ | | ○ | | ○ | |
| Type10 | | ○ | | ○ | | | ○ |
| Type11 | | ○ | | ○ | ○ | ○ | |
| Type12 | | ○ | | ○ | ○ | | ○ |
| Type13 | | ○ | | ○ | | ○ | ○ |
| Type14 | | ○ | | ○ | ○ | ○ | ○ |
| Type15 | | | ○ | ○ | ○ | | |
| Type16 | | | ○ | ○ | | ○ | |
| Type17 | | | ○ | ○ | | | ○ |
| Type18 | | | ○ | ○ | ○ | ○ | |
| Type19 | | | ○ | ○ | ○ | | ○ |
| Type20 | | | ○ | ○ | | ○ | ○ |
| Type21 | | | ○ | ○ | ○ | ○ | ○ |
| Type22 | ○ | ○ | | ○ | ○ | | |
| Type23 | ○ | ○ | | ○ | | ○ | |
| Type24 | ○ | ○ | | ○ | | | ○ |
| Type25 | ○ | ○ | | ○ | ○ | ○ | |
| Type26 | ○ | ○ | | ○ | ○ | | ○ |
| Type27 | ○ | ○ | | ○ | | ○ | ○ |
| Type28 | ○ | ○ | | ○ | ○ | ○ | ○ |
| Type29 | ○ | | ○ | ○ | ○ | | |
| Type30 | ○ | | ○ | ○ | | ○ | |
| Type31 | ○ | | ○ | ○ | | | ○ |
| Type32 | ○ | | ○ | ○ | ○ | ○ | |
| Type33 | ○ | | ○ | ○ | ○ | | ○ |
| Type34 | ○ | | ○ | ○ | | ○ | ○ |
| Type35 | ○ | | ○ | ○ | ○ | ○ | ○ |
| Type36 | | ○ | ○ | ○ | ○ | | |
| Type37 | | ○ | ○ | ○ | | ○ | |
| Type38 | | ○ | ○ | ○ | | | ○ |
| Type39 | | ○ | ○ | ○ | ○ | ○ | |
| Type40 | | ○ | ○ | ○ | ○ | | ○ |
| Type41 | | ○ | ○ | ○ | | ○ | ○ |
| Type42 | | ○ | ○ | ○ | ○ | ○ | ○ |
| Type43 | ○ | ○ | ○ | ○ | ○ | | |
| Type44 | ○ | ○ | ○ | ○ | | ○ | |
| Type45 | ○ | ○ | ○ | ○ | | | ○ |
| Type46 | ○ | ○ | ○ | ○ | ○ | ○ | |
| Type47 | ○ | ○ | ○ | ○ | ○ | | ○ |
| Type48 | ○ | ○ | ○ | ○ | | ○ | ○ |
| Type49 | ○ | ○ | ○ | ○ | ○ | ○ | ○ |

The composition of the present invention is classified into composition A and composition B. Composition A may further comprise other compounds. The "other compounds" include a liquid crystalline compound, additives and the like. The liquid crystalline compound is different from compounds (1-1) to (4-4) and is mixed with the composition for the purpose of adjusting the characteristics of the composition. The additives include an optically active compound, a coloring matter and the like. An optically active compound is mixed with the composition for the purpose of giving a twist angle by inducing a helical structure. A coloring matter is mixed with the composition to conform to the element of a guest host (GH) mode.

Composition B essentially consists of the compounds selected from compounds (1-1) to (4-4). The term "essentially" in this specification means that the composition does not comprise any liquid crystalline compound other than these compounds. The term "essentially" also means that the composition B may further comprise impurities, an optically active compound, a coloring material and the like. Composition B comprises fewer components than composition A and is preferable to compound A from the viewpoint of cost. On the other hand, composition A is preferable to composition B in that the physical properties of composition A can be further adjusted by mixing with other liquid crystalline compounds.

Secondly explained are main characteristics of the component compounds and their effects on the composition. Main characteristics of the compounds are summarized in Table 3, wherein L means large or high, M means middle degree and S means small or low. 0 means that a dielectric anisotropy is about zero (or extremely small). Symbols L, M and S are based on the relative evaluation in these compounds.

TABLE 3

Characteristics of the compounds

| | (1-1) | (1-2) | (1-3) | (2) | (3-1) | (3-2) | (3-3) |
|---|---|---|---|---|---|---|---|
| Higher limit temperature | S | M | M | M | S | M | L |
| Viscosity | L | L | L | M | S | S | S |
| Optical anisotropy | S | M | L | M | S | M | L |
| Dielectric anisotropy | M | M | L | L | 0 | 0 | 0 |
| Specific resistance | L | L | L | S | L | L | L |

Compounds (1-1) to (1-3) elevate the specific resistance and dielectric anisotropy of the composition. A compound (2) elevates the dielectric anisotropy of the composition, and reduces the specific resistance of the composition. Compounds (3-1) to (3-3) elevate the specific resistance of the composition, and reduce the viscosity of the composition.

Compounds (4-1) to (4-4) are mixed with the composition for the purpose of further adjusting the characteristics of the composition. Compounds (4-1) and (4-2) are suitable for adjusting the dielectric anisotropy of the composition. Compounds (4-3) and (4-4) are suitable for adjusting the viscosity of the composition.

Third explained are suitable mixing ratios of the component compounds of the composition and the reasons thereof: The content of the first component is preferably 5% or more for dielectric anisotropy of the composition, and is preferably 50% or less for reducing the lower limit temperature. More preferably, it is 10 to 40%. The content of the second component is preferably 5% or more for elevating the dielectric anisotropy, and is preferably 40% or less for reducing the lower limit temperature or elevating the specific resistance. More preferably, it is 5 to 30%. The content of the third component is preferably 10% or more for reducing the viscosity, and is preferably 70% or less for reducing the lower limit temperature or elevating the dielectric anisotropy. More preferably, it is 20 to 60%. The content of the fourth component, if added, is preferably 1% or more for adjusting the characteristics, and is preferably 15% or less for reducing the lower limit temperature. More preferably, it is 1 to 40%. Most preferably, it is 10 to 40%.

Fourth, desirable molecular structures of the compounds as a component are explained below: The symbol $R^1$ is used in several formulas of the compounds. $R^1$ may be identical or different in these formulas. For example, in one case, $R^1$ is ethyl in both compounds (1-1) and (1-2). In another case, $R^1$ of compound (1-1) is ethyl and $R^1$ of compound (1-2) is propyl. This rule is also applicable to the symbols $R^2$, $R^3$, $R^4$, $R^5$, $R^6$, $A^1$, $A^2$, $A^3$, $A^4$, $A^5$, $Z^1$, $Z^2$, $Z^3$, $Z^4$, $X^1$, $X^2$, $Y^1$, $Y^2$, and n.

Preferred $R^1$ is alkyl of 1 to 10 carbons. Preferred $R^2$ is alkyl of 1 to 10 carbons or alkenyl of 2 to 10 carbons in which at least one of hydrogens may be replaced by fluorine. Preferred $R^3$ is alkyl of 1 to 10 carbons or alkoxy of 1 to 10 carbons. Preferred $R^4$ is alkyl of 1 to 10 carbons or alkoxymethyl of 1 to 10 carbons. Preferred $R^5$ is alkyl of 1 to 10 carbons or alkenyl of 2 to 10 carbons.

Preferred alkyl is methyl, ethyl, propyl, butyl, pentyl, hexyl, heptyl, or octyl. More preferred alkyl is ethyl, propyl, butyl, pentyl, or heptyl.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. More preferred alkenyl is vinyl, 1-propenyl, 3-butenyl, or 3-pentenyl. Preferred configuration of —CH═CH— in the alkenyl depends on the position of double bond. Such alkenyl as 1-propenyl, 1-butenyl, 1-pentenyl, 1-hexenyl, 3-pentenyl, and 3-hexenyl are preferably in trans configuration. Such alkenyl as 2-butenyl, 2-pentenyl and 2-hexenyl are preferably cis configuration.

Preferred example of alkenyl in which one or more hydrogens are replaced by fluorine is 2,2-difluorovinyl, 3,3-difluoro-2-propenyl, 4,4-difluoro-3-butenyl, or 5,5-difluoro-4-pentenyl. More preferred example is 2,2-difluorovinyl or 4,4-difluoro-3-butenyl.

Preferred alkoxy is methoxy, ethoxy, propoxy, butoxy, pentyloxy, hexyloxy, or heptyloxy. More preferred alkoxy is methoxy or ethoxy.

Preferred alkoxymethyl is methoxymethyl, ethoxymethyl, propoxymethyl, butoxymethyl, or pentyloxymethyl. More preferred alkoxymethyl is methoxymethyl.

1,4-Cyclohexylene or 1,3-dioxane-2,5-diyl of the component compound is preferably in trans configuration rather than cis configuration.

Fifth, concrete examples of the compounds as a component are given. The desirable compounds (1-1) to (4-4) are shown below as compounds (1-1-1) to (4-4-2). The symbol $R^1$, $R^5$ and $R^6$ were used in several of the desirable compounds. In any two compounds, a group represented by $R^1$ and so on may be identical or different as already stated.

$R^1$ and $R^6$ are independently alkyl, $R^5$ is alkyl or alkenyl. Preferred $R^1$ or $R^6$ is alkyl of 1 to 10 carbons. Preferred $R^5$ is alkyl of 1 to 10 carbons or alkenyl of 2 to 10 carbons. Preferred alkyl or alkenyl, and more preferred alkyl or alkenyl is as described above. Preferred configuration of —CH═CH— in the alkenyl is as described above. 1,4-Cyclohexylene and 1,3-dioxane-2,5-diyl of the preferred compound are preferably in trans configuration rather than cis configuration.
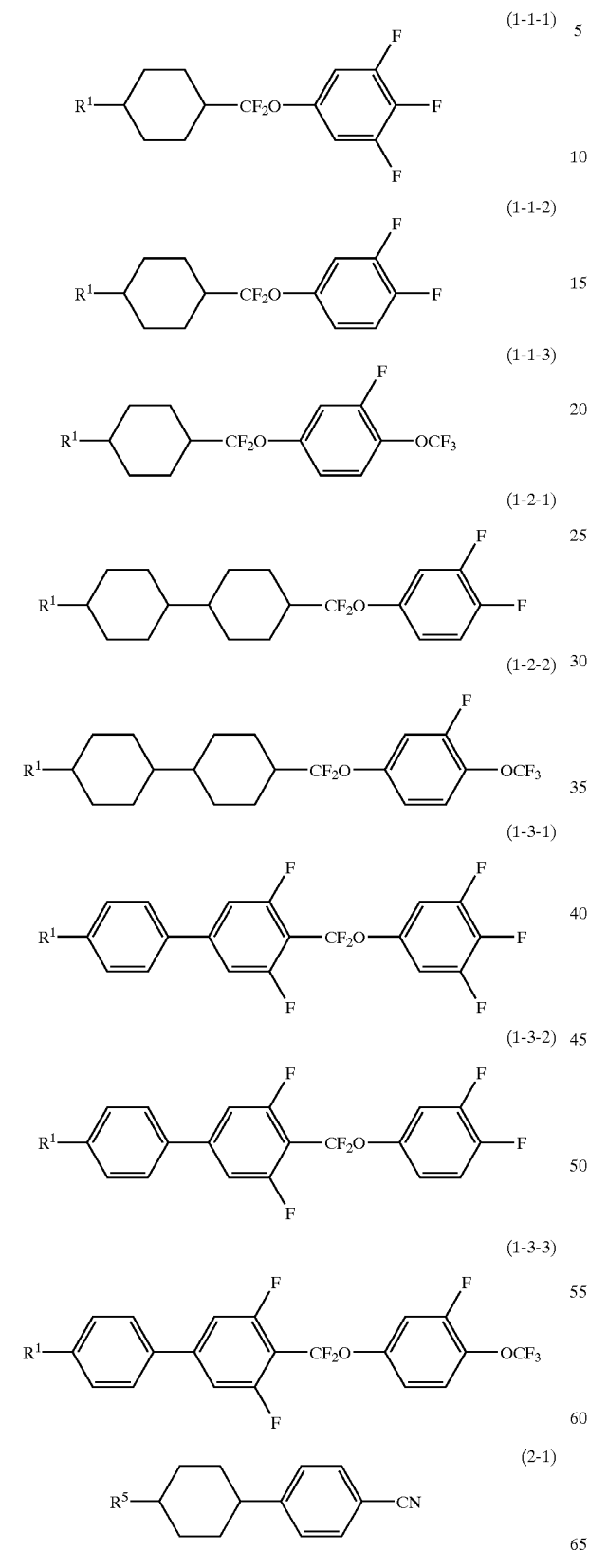
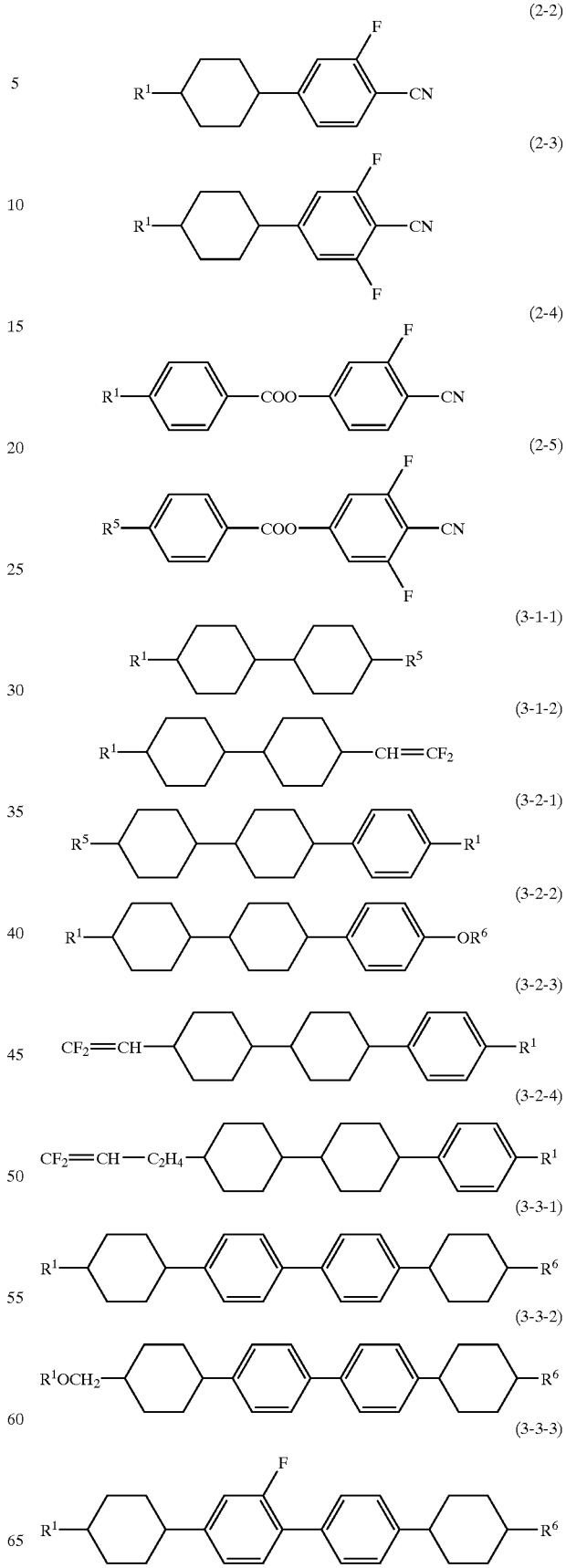

(3-3-4)
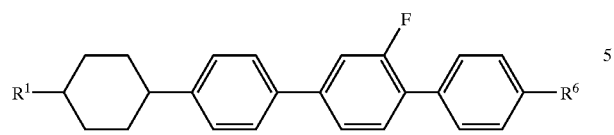
(4-1-1)
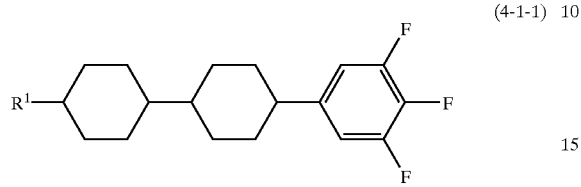
(4-1-2)
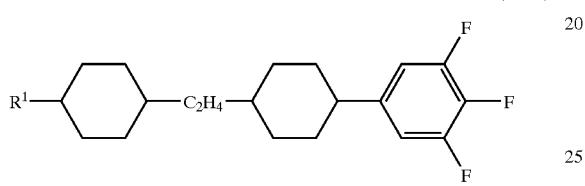
(4-1-3)
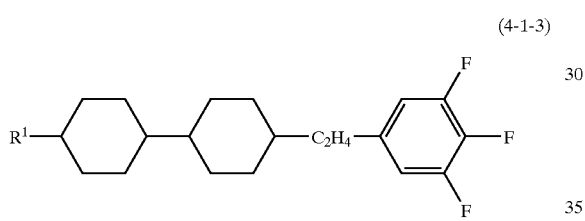
(4-1-4)
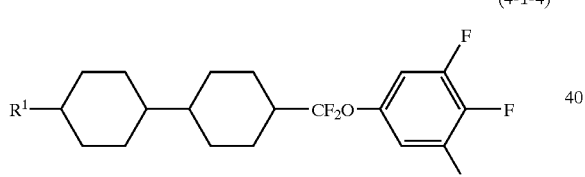
(4-1-5)
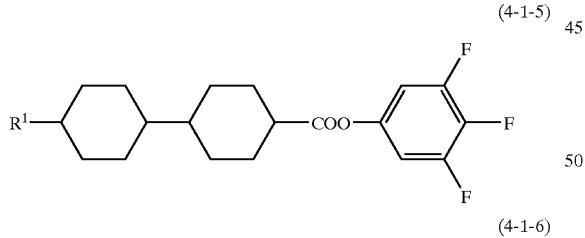
(4-1-6)
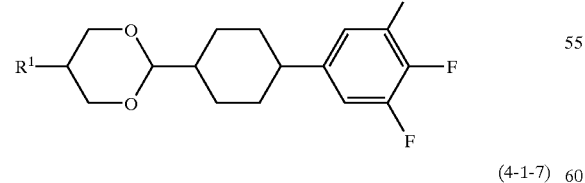
(4-1-7)
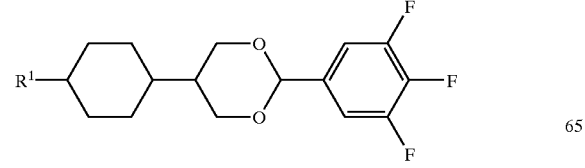
(4-1-8)
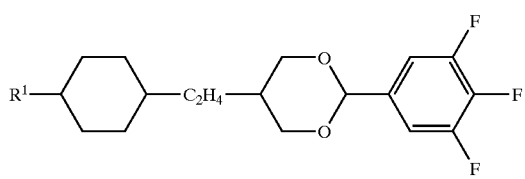
(4-1-9)
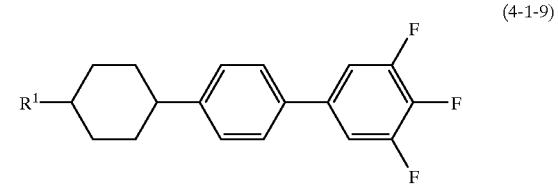
(4-1-10)
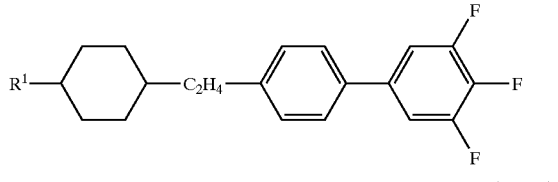
(4-1-11)
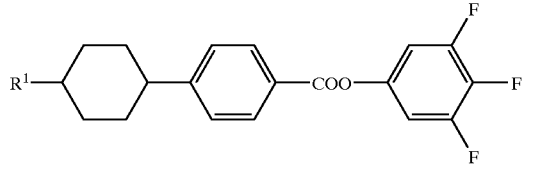
(4-1-12)
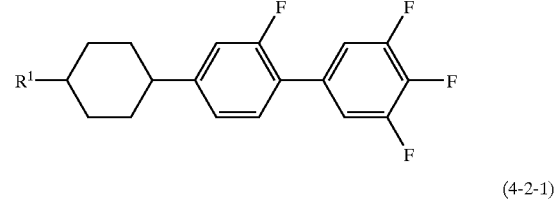
(4-2-1)
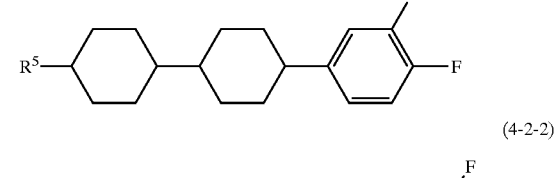
(4-2-2)
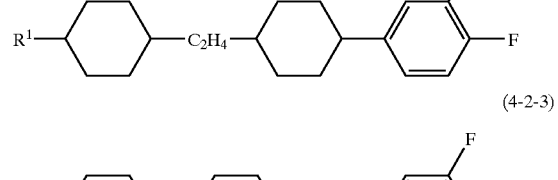
(4-2-3)
(4-2-4)
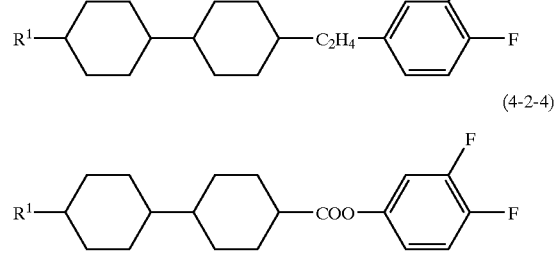

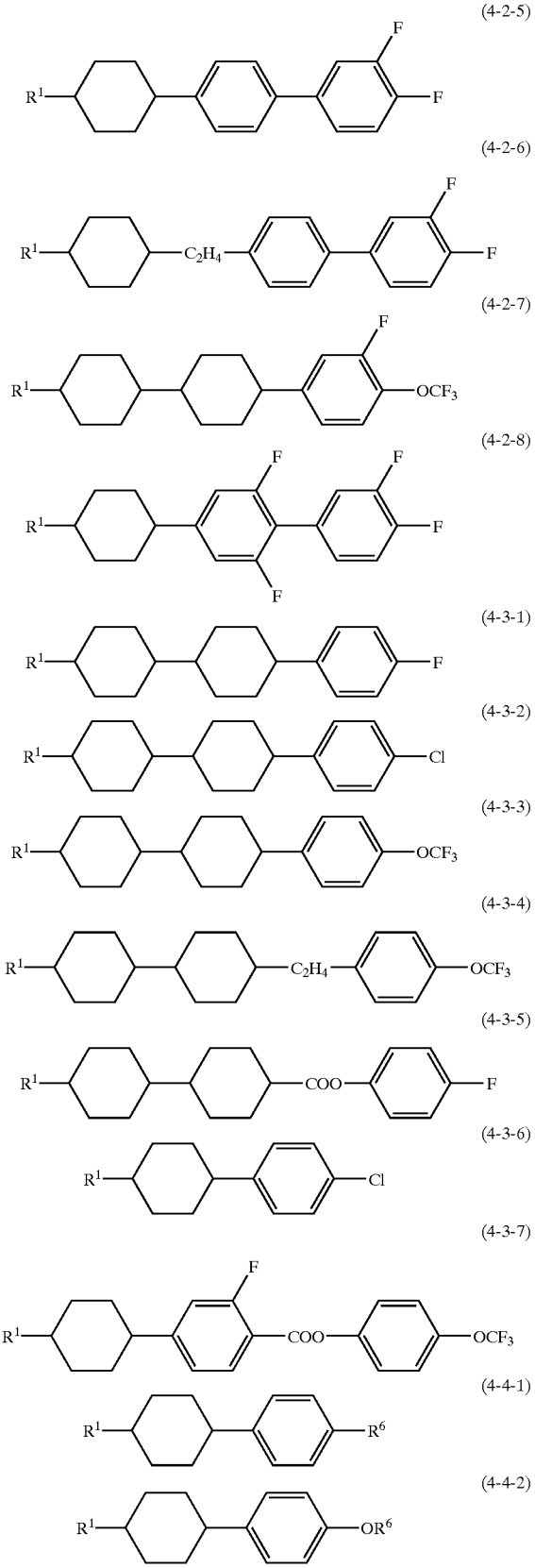

Sixth, the preparation of the compounds as a component is explained. These compounds are prepared by known methods. The preparation is explained with an example. Compounds (1-1-1), (1-2-1) and (1-3-1) are prepared by modifying the method disclosed in JP-A 251186/1998. Compound (2-2) is prepared according to the method described in JP-A 176240/1984. Compound (3-1-1) is prepared according to the method described in JP-A 70624/1984. Compound (3-2-1) is prepared according to the method described in JP-A 165328/1982. Compound (3-3-4) is prepared according to the method described in JP-A 237949/1990. Compound (4-1-1) is prepared according to the method described in JP-A 233626/1990. Compound (4-2-1) is prepared according to the method described in JP-A 154135/1982. Compound (4-3-6) is prepared according to the method described in JP-A 2226/1982. Compound (4-4-1) is prepared according to the method described in JP-A 68636/1981.

The compounds for which preparation methods are not specified above can be prepared according to the methods described in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Kouza) (Maruzen, Inc.) and the like. The composition is prepared according to known methods from the compounds thus obtained. For example, the compounds are mixed and heated to dissolve each other to prepare a composition.

The optical anisotropy of the present composition mainly ranges from 0.08 to 0.12. By controlling the mixing ratio of the component compounds or by further mixing any compounds other than the component compounds, the composition having an anisotropy of 0.07 to 0.18 or 0.06 to 0.20 may be prepared. The composition comprises a compound having cyano in a terminal, and has especially a large dielectric anisotropy. An AM element of an IPS mode which comprises the composition has a high voltage holding ratio. Accordingly, the composition is suitable especially for a transmission type AM element of an IPS mode.

The composition of the invention can be used not only for an AM element but also for a PM element. It can be used for the elements of the modes such as PC, TN, STN, ECB, OCB, and VA. These elements may be a reflection type, a transmission type or a semi-transmission type. The composition is usable for such elements as nematic curvilinear aligned phase (NCAP) made by microcapsulating the composition and polymer dispersed (PD) element obtained by forming a three dimensional net-work polymer in the composition, e.g., polymer network (PN) element.

EXAMPLE

The present invention shall be explained in detail by way of Examples, which do not limit the present invention. Compounds described in Comparative Examples and Examples are expressed by the symbols according to the definition set forth in Table 4. In Table 4, the configuration of 1,4-cyclohexylene and 1,3-dioxane-2,5-diyl is a trans-form. The bonding group of —CH═CH— is a trans-form. The parenthesized number next to the symbolized compounds in the Examples corresponds to the number of the desirable compound. The symbol (–) next to the symbolized compound in Example 13 denotes the other compound than the numbered compounds. The ratio of compounds (percentage) is expressed in terms of weight percent (% by weight) based on the total weight of the composition. The characteristics of the composition are given last.

TABLE 4

Method for Description of Compounds Using Symbols
R—(A₁)—Z₁————Zₙ—(Aₙ)—X

| 1) Left terminal group R— | Symbol |
|---|---|
| $C_nH_{2n+1}$— | n- |
| $C_nH_{2n+1}OC_mH_{2m}$— | nOm- |
| $CH_2=CH$— | V— |
| $CH_2=CHC_nH_{2n}$— | Vn- |
| $C_nH_{2n+1}CH=CHC_mH_{2m}$— | nVm- |
| $CF_2=CH$— | VFF— |
| $CF_2=CHC_nH_{2n}$— | VFFn- |

| 2) Ring structure —(Aₙ)— | Symbol |
|---|---|
|  | B |
| 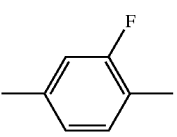 | B(F) |
| 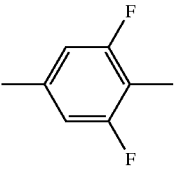 | B(F, F) |
|  | H |
| 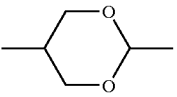 | G |

| 3) Bonding group —Zₙ— | Symbol |
|---|---|
| —$C_2H_4$— | 2 |
| —COO— | E |
| —C≡C— | T |
| —$C_2F_4$— | W |
| —$CF_2O$— | X |

| 4) Right terminal group —X | Symbol |
|---|---|
| —F | —F |
| —Cl | —CL |
| —$OCF_3$ | —$OCF_3$ |
| —CN | —C |
| —$C_nH_{2n+1}$ | -n |
| —$OC_nH_{2n+1}$ | —On |
| —CH=$CH_2$ | —V |
| —CH=$CHC_nH_{2n+1}$ | —Vn |
| —CH=$CF_2$ | —VFF |

5) Examples of Description

Example 1. 5-HXB(F, F)—F

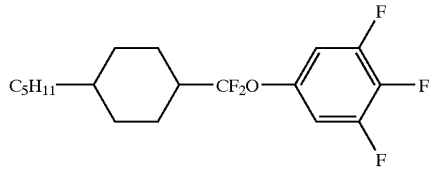

TABLE 4-continued

Method for Description of Compounds Using Symbols
R—(A₁)—Z₁————Zₙ—(Aₙ)—X

Example 2. 3-HB(F)—C

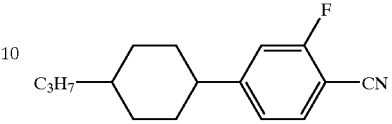

Example 3. 3-H2HB(F)—F

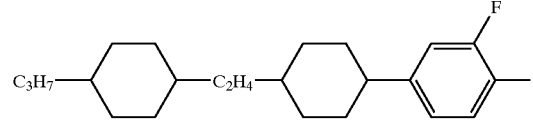

The characteristic values were measured according to the following methods:

Higher limit temperature (NI; ° C.) of a nematic phase: A sample was put on a hot plate in a melting point measuring apparatus equipped with a polarizing microscope and heated at the rate of 1° C. per minute. The temperature at which a part of the sample began to change from a nematic phase into an isotropic liquid was measured. The higher limit temperature of a nematic phase may occasionally be abbreviated to "higher limit temperature".

Lower limit temperature (Tc; ° C.) of a nematic phase: A sample having a nematic phase was kept in a freezer at temperatures of 0° C., −10° C., −20° C., −30° C. and −40° C. for ten days, respectively, to observe liquid crystal phase. For example, when the sample remains in a nematic phase at −20° C. and changes to crystals or a smectic phase at −30° C., Tc is then expressed as <−20° C. The lower limit temperature may occasionally be abbreviated to "lower limit temperature".

Optical anisotropy (Δn; measured at 25° C.): Optical anisotropy was measured by means of Abbe refractometer with light having the wavelength of 589 nm.

Viscosity (η; mPa·s, measured at 20° C.): Viscosity was measured by means of E-type viscometer.

Dielectric anisotropy (Δε; measured at 25° C.): A sample was put into a TN element with a cell gap between two sheets of glass substrates of 9 μm and a twist angle of 80 degrees. A dielectric constant of a liquid crystal molecule in the parallel (longitudinal) direction (ε∥) was measured by applying a voltage of 10 volts to the cell. A dielectric constant of a liquid crystal molecule in the perpendicular direction (ε⊥) was measured by applying a voltage of 0.5 volt to the cell. The dielectric anisotropy was calculated by an equation of Δε=ε∥−ε⊥. A dielectric constant of a composition having a positive dielectric constant was measured by this method. When a compound is used as a sample, it was mixed with a suitable liquid crystal composition to measure the dielectric constant of the composition formed.

Threshold voltage (Vth; measured at 25° C.; V): A sample was put into a TN element of a normally white mode having a cell gap of (0.5Δn) μm between two glass plates and a twist angle of 80 degrees. Δn is a value of the optical anisotropy measured by the above method. A rectangular wave having a frequency of 32 Hz was applied to this element. The applied voltage was increased, and when a transmittance of light passing through the element reached 90%, the voltage was measured.

Voltage holding ratio (VHR; measured at 85° C.; %): A voltage holding ratio was measured according to the method described in EIAJ·ED-2521A of Standard of Electric Industries Association of Japan for measuring a voltage holding ratio of an element having a liquid crystal composition and an aligning film. An IPS element (comb shaped electrode cell) used for measurement has a polyimide aligning film and has a cell gap of 6 μm. A wave form of a voltage applied to an IPS element was observed by means of a cathode ray oscilloscope to determine an area between a voltage curve and the horizontal line in a unit frequency. After removing the IPS element, a wave form of the voltage was observed in the same manner to determine an area. A voltage holding ratio was calculated by comparison of the two areas.

Comparative Example 1

The composition of Example 10 disclosed in JP-A 123170/2001 is chosen here, because it comprises compound (1-3) of the present invention and has the smallest optical anisotropy. The following are the components and characteristics of the composition. This composition is high in lower limit temperature, high in viscosity, large in optical anisotropy, and small in dielectric anisotropy.

| | |
|---|---|
| 3-BBB(F, F)XB—OCF3 | 7% |
| 2-HB(F, F)XB(F, F)—F | 2% |
| 2-BB(F, F)XB(F, F)—F | 8% |
| 3-BB(F, F)XB(F)—OCF3 | 2% |
| 3-HBB(F, F)XB(F)—F | 2% |
| 2-HBB(F, F)XB(F, F)—F | 3% |
| 3-HBB(F, F)XB(F, F)—F | 10% |
| 5-HBB(F)B-2 | 3% |
| 5-HBB(F)B-3 | 2% |
| 3-HB—O2 | 7% |
| 3-HH-4 | 3% |
| 2-HHB—CL | 7% |
| 3-HHB—CL | 7% |
| 4-HHB—CL | 8% |
| 3-HHB-1 | 8% |
| 3-HHB-3 | 3% |
| 3-HGB(F, F)—F | 3% |
| 2-HBEB(F, F)—F | 3% |
| 3-HBEB(F, F)—F | 4% |
| 4-HBEB(F, F)—F | 4% |
| 5-HBEB(F, F)—F | 4% |

NI = 114.8° C.; $T_c$ < −20° C.; Δn = 0.135; Δε = 7.3; η = 37.2 mPa · s; VHR = 93.5%.

Comparative Example 2

The composition of Example 5 disclosed in JP-A 2044361998 is chosen here, because it comprises compound (1-1) and (1-2) of the present invention and has the lowest viscosity. The following are the components and characteristics of the composition. This composition is low in higher limit temperature, high in lower limit temperature, high in viscosity, and small in dielectric anisotropy.

| | |
|---|---|
| 5-HXB(F)—F | 2% |
| 5-HXB(F)—OCF3 | 2% |
| 2-HHXB(F, F)—F | 5% |
| 3-HHXB(F, F)—F | 5% |
| 4-HHXB(F, F)—F | 5% |
| 5-HHXB(F, F)—F | 5% |
| 7-HB(F, F)—F | 8% |
| 3-H2HB(F, F)—F | 7% |
| 3-HHB(F, F)—F | 10% |
| 4-HHB(F, F)—F | 5% |
| 2-HHBB(F, F)—F | 4% |
| 3-HHBB(F, F)—F | 4% |
| 3-HHBXB(F, F)—F | 2% |
| 3-HHBXB(F)—OCF3 | 2% |
| 3-HBXB(F)—OCF3 | 11% |
| 4-HBXB(F)—OCF3 | 11% |
| 5-HBXB(F)—OCF3 | 12% |

NI = 70.4° C.; $T_c$ < −20° C.; Δn = 0.082; Δε = 5.4; η = 23.8 mPa · s; VHR = 93.1%.

Comparative Example 3

The composition of Example 3 disclosed in JP-A 3053/2001 is chosen here, because it comprises compound (1-3) of the present invention and has the largest dielectric anisotropy. The following are the components and characteristics of the composition. This composition is low in higher limit temperature, high in lower limit temperature, high in viscosity, and large in optical anisotropy.

| | |
|---|---|
| 2-BB(F, F)XB(F, F)—F | 12% |
| 3-BB(F, F)XB(F, F)—F | 13% |
| 3-HBB(F, F)XB(F)—F | 5% |
| 2-HBB(F, F)XB(F, F)—F | 10% |
| 3-HBB(F, F)XB(F, F)—F | 10% |
| 2-BB(F, F)XBB(F)—F | 5% |
| 3-BB(F, F)XBB(F)—F | 5% |
| 3-BB(F, F)XB(F, F)B(F)—F | 3% |
| 2-BBB(F, F)XB(F, F)—F | 3% |
| 3-BBB(F, F)XB(F, F)—F | 4% |
| 3-HHB(F, F)—F | 8% |
| 4-HHB(F, F)—F | 5% |
| 3-H2HB(F, F)—F | 10% |
| 3-H2BB(F, F)—F | 7% |

NI = 78.7° C.; $T_c$ < −20° C.; Δn = 0.139; Δε = 16.4; η = 39.4 mPa · s; VHR = 93.6%.

Comparative Example 4

The composition of Example 6 disclosed in JP-A 3053/2001 is chosen here, because it comprises compound (1-3) of the present invention and has the lowest viscosity.

The following are the components and characteristics of the composition. This composition is low in higher limit temperature, high in lower limit temperature, and small in dielectric anisotropy.

| | |
|---|---|
| 2-BB(F, F)XB(F, F)—F | 9% |
| 3-BB(F, F)XB(F, F)—F | 9% |
| 7-HB(F, F)—F | 6% |
| 3-H2HB(F, F)—F | 9% |
| 4-H2HB(F, F)—F | 9% |
| 5-H2HB(F, F)—F | 9% |
| 3-HHB(F, F)—F | 7% |
| 4-HHB(F, F)—F | 5% |
| 3-HH2B(F, F)—F | 4% |
| 3-HHBB(F, F)—F | 3% |
| 3-HB—O2 | 3% |
| 3-HH-4 | 10% |
| 3-HH-5 | 5% |
| 3-HHB-1 | 2% |
| 4-HHB—CL | 4% |
| 2-HHHB(F, F)—F | 2% |
| 3-HHHB(F, F)—F | 2% |
| 4-HHHB(F, F)—F | 2% |

NI = 72.9° C.; $T_c$ < −20° C.; Δn = 0.082; Δε = 8.0; η = 20.8 mPa · s; VHR = 92.9%.

Comparative Example 5

The composition of Example 19 disclosed in JP-A 3051/2001 is chosen here, because it comprises compound (1-3)

of the present invention and has the lowest viscosity. The following are the components and characteristics of the composition. This composition is low in higher limit temperature and small in dielectric anisotropy.

| | |
|---|---|
| 3-BB(F, F)XB(F, F)—F | 3% |
| 5-HB(F, F)XB(F, F)—F | 3% |
| 3-HBB(F, F)—F | 20% |
| 5-HBB(F, F)—F | 15% |
| 3-HHBB(F, F)—F | 6% |
| 3-HHB(F, F)—F | 8% |
| 3-HHEB(F, F)—F | 10% |
| 2-HBEB(F, F)—F | 3% |
| 3-HBEB(F, F)—F | 5% |
| 5-HBEB(F, F)—F | 3% |
| 5-HB—CL | 11% |
| 3-HH-4 | 8% |
| 3-HHB-1 | 5% |

NI = 74.2° C.; $T_c$ < −30° C.; Δn = 0.104; Δϵ = 8.8; η = 22.0 mPa · s; VHR = 93.3%.

Comparative Example 6

The composition of A in table 2 disclosed in JP-A 3051/2001 is chosen here, because it comprises compound (1-3) and (2) of the present invention. The following are the components and characteristics of the composition. This composition is low in higher limit temperature, high in lower limit temperature, high in viscosity, and large in optical anisotropy.

| | |
|---|---|
| 3-HB—C | 20.4% |
| 5-HB—C | 30.6% |
| 5-HB—C | 21.25% |
| 3-BB—C | 12.75% |
| 3-BB(F, F)XB(F, F)—F | 15% |

NI = 60.2° C.; $T_c$ < −20° C.; Δn = 0.133; Δϵ = 13.8; η = 29.0 mPa · s; VHR = 92.1%.

Comparative Example 7

The composition of Example 11 disclosed in JP-A 204016/1998 is chosen here, because it comprises compound (1-2) and (2) of the present invention and has the largest dielectric anisotropy. The following are the components and characteristics of the composition. This composition is low in higher limit temperature, high in lower limit temperature, high in viscosity, and large in optical anisotropy.

| | |
|---|---|
| 3-HB—C | 20.4% |
| 5-HB—C | 30.6% |
| 7-HB—C | 21.25% |
| 3-HBB—C | 12.75% |
| 3-HHXB(F, F)—F | 15% |

NI = 73.7° C.; $T_c$ < −20° C.; Δn = 0.128; Δϵ = 14.4; η = 28.6 mPa · s; VHR = 91.9%.

Comparative Example 8

The composition of Example 24 disclosed in JP-A 204016/1998 is chosen here, because it comprises compound (1-2) and (2) of the present invention and has the lowest viscosity. The following are the components and characteristics of the composition. This composition is high in lower limit temperature, large in optical anisotropy, and small in dielectric anisotropy.

| | |
|---|---|
| 3-HHXB(F, F)—F | 11% |
| 1V2-BEB(F,F)—C | 5% |
| 3-HB—C | 25% |
| 1-BTB-3 | 5% |
| 2-BTB-1 | 10% |
| 3-HH-4 | 11% |
| 3-HHB-3 | 9% |
| 3-H2BTB-2 | 4% |
| 3-H2BTB-3 | 4% |
| 3-H2BTB-4 | 4% |
| 3-HB(F)TB-2 | 6% |
| 3-HB(F)TB-3 | 6% |

NI = 82.8° C.; $T_c$ < −20° C.; Δn = 0.158; Δϵ = 8.3; η = 14.3 mPa · s; VHR = 92.2%.

Comparative Example 9

The composition of Example 21 disclosed in WO96/23851A is chosen here, because it has the largest dielectric anisotropy. The following are the components and characteristics of the composition. This composition is low in higher limit temperature, high in lower limit temperature, high in viscosity, and small in optical anisotropy.

| | |
|---|---|
| 2-HHB(F, F)—F | 16% |
| 3-HHB(F, F)—F | 14% |
| 5-HHB(F, F)—F | 11% |
| 2-HHB—OCF3 | 17% |
| 3-HHB—OCF3 | 14% |
| 2-GB(F)—C | 3% |
| 3-GB(F)—C | 6% |
| 5-GB(F)—C | 11% |
| 3-HGB(F, F)—F | 8% |

NI = 59.8° C.; $T_c$ < −10° C.; Δn = 0.074; Δϵ = 12.9; η = 35.8 mPa · s; VHR = 92.5%.

Comparative Example 10

The composition of Example 31 disclosed in WO96/23851A is chosen here, because it has the lowest rotational viscosity coefficient (γ1) The following are the components and characteristics of the composition. This composition is low in higher limit temperature, high in lower limit temperature, and small in optical anisotropy.

| | |
|---|---|
| 3-HB—C | 8% |
| 2-HHB(F, F)—F | 13% |
| 3-HHB(F, F)—F | 7% |
| 5-HHB(F, F)—F | 9% |
| 2-HHB—OCF3 | 16% |
| 3-HHB—OCF3 | 15% |
| 5-HHB—OCF3 | 5% |
| 2-HB(F, F)—C | 6% |
| 3-HB(F, F)—C | 8% |
| 3-HH-4 | 8% |
| 3-HH-5 | 5% |

NI = 67.5° C.; $T_c$ < −10° C.; Δn = 0.073; Δϵ = 9.7; η = 28.3 mPa · s; VHR = 92.3%.

Example 1

| | | |
|---|---|---|
| 5-HXB(F, F)—F | (1-1-1) | 3% |
| 3-HXB(F)—F | (1-1-2) | 3% |
| 3-HXB(F)—OCF3 | (1-1-3) | 3% |
| 2-HHXB(F)—F | (1-2-1) | 5% |
| 3-HHXB(F)—F | (1-2-1) | 10% |
| 2-HHXB(F)—OCF3 | (1-2-2) | 5% |
| 3-HHXB(F)—OCF3 | (1-2-2) | 10% |
| 3-HB—C | (2-1) | 29% |
| 3-HH-4 | (3-1-1) | 5% |
| 5-HH—VFF | (3-1-2) | 12% |
| VFF—HHB-1 | (3-2-3) | 3% |
| VFF2-HHB-1 | (3-2-4) | 3% |
| 1O1-HBBH-3 | (3-3-2) | 3% |
| 1O1-HBBH-4 | (3-3-2) | 3% |
| 1O1-HBBH-5 | (3-3-2) | 3% |

NI = 84.9° C.; $T_c$ < −30° C.; Δn = 0.100; Δε = 10.6; η = 18.2 mPa · s; VHR = 92.3%.

Example 2

| | | |
|---|---|---|
| 3-HHXB(F)—F | (1-2-1) | 10% |
| 3-HHXB(F)—OCF3 | (1-2-2) | 10% |
| 3-BB(F, F)XB(F, F)—F | (1-3-1) | 6% |
| 3-BB(F, F)XB(F, F)—F | (1-3-2) | 6% |
| 3-HB(F)—C | (2-2) | 16% |
| 3-HH-4 | (3-1-1) | 10% |
| 5-HH—V | (3-1-1) | 20% |
| 3-HHB-1 | (3-2-1) | 3% |
| V-HHB-1 | (3-2-1) | 4% |
| VFF—HHB-1 | (3-2-3) | 5% |
| 3-HBBH-5 | (3-3-1) | 3% |
| 1O1-HBBH-4 | (3-3-2) | 3% |
| 1O1-HBBH-5 | (3-3-2) | 4% |

NI = 87.6° C.; $T_c$ < −30° C.; Δn = 0.091; Δε = 11.5; η = 17.7 mPa · s; VHR = 92.8%.

Example 3

| | | |
|---|---|---|
| 5-HXB(F, F)—F | (1-1-1) | 3% |
| 3-HXB(F)—F | (1-1-2) | 3% |
| 3-HXB(F)—OCF3 | (1-1-3) | 3% |
| 3-HHXB(F)—F | (1-2-1) | 10% |
| 3-HHXB(F)—OCF3 | (1-2-2) | 10% |
| 3-BB(F, F)XB(F, F)—F | (1-3-1) | 3% |
| 3-BB(F, F)XB(F)—F | (1-3-2) | 3% |
| 3-BB(F, F)XB(F)—OCF3 | (1-3-3) | 3% |
| 2-BEB(F)—C | (2-4) | 3% |
| 3-BEB(F)—C | (2-4) | 4% |
| 4-BEB(F)—C | (2-4) | 4% |
| 3-HH-4 | (3-1-1) | 10% |
| 5-HH—V | (3-1-1) | 20% |
| 3-HHB-1 | (3-2-1) | 3% |
| V-HHB-1 | (3-2-1) | 3% |
| 1O1-HBBH-4 | (3-3-2) | 5% |
| 1O1-HBBH-5 | (3-3-2) | 5% |
| 5-HB(F)BH-3 | (3-3-3) | 5% |

NI = 87.3° C.; $T_c$ < −30° C.; Δn = 0.094; Δε = 12.6; η = 20.6 mPa · s; VHR = 92.3%.

Example 4

| | | |
|---|---|---|
| 5-HXB(F, F)—F | (1-1-1) | 4% |
| 3-HHXB(F)—F | (1-2-1) | 10% |
| 3-HHXB(F)—OCF3 | (1-2-2) | 10% |
| 3-BB(F, F)XB(F, F)—F | (1-3-1) | 5% |
| 3-BB(F, F)XB(F)—F | (1-3-2) | 5% |
| 3-BB(F, F)XB(F)—OCF3 | (1-3-3) | 5% |
| 3-HB(F, F)—C | (2-3) | 10% |
| 3-HH-4 | (3-1-1) | 5% |
| 5-HH—V | (3-1-1) | 25% |
| VFF—HHB-1 | (3-2-3) | 3% |
| VFF2-HHB-1 | (3-2-4) | 3% |
| 1O1-HBBH-3 | (3-3-2) | 3% |
| 1O1-HBBH-4 | (3-3-2) | 6% |
| 1O1-HBBH-5 | (3-3-2) | 6% |

NI = 83.8° C.; $T_c$ < −30° C.; Δn = 0.093; Δε = 12.2; η = 19.7 mPa · s; VHR = 92.2%.

Example 5

| | | |
|---|---|---|
| 5-HXB(F, F)—F | (1-1-1) | 2% |
| 3-HXB(F)—F | (1-1-2) | 2% |
| 3-HXB(F)—OCF3 | (1-1-3) | 2% |
| 2-HHXB(F)—F | (1-2-1) | 5% |
| 3-HHXB(F)—F | (1-2-1) | 10% |
| 3-BB(F, F)XB(F, F)—F | (1-3-1) | 15% |
| 3-HB—C | (2-1) | 16% |
| 1V2-BEB(F, F)—C | (2-5) | 3% |
| 3-HH-4 | (3-1-1) | 6% |
| 5-HH—V | (3-1-1) | 18% |
| 3-HHB-1 | (3-2-1) | 3% |
| V-HHB-1 | (3-2-1) | 5% |
| 3-HHB—O1 | (3-2-2) | 3% |
| 1O1-HBBH-4 | (3-3-2) | 5% |
| 1O1-HBBH-5 | (3-3-2) | 5% |

NI = 81.4° C.; $T_c$ < −30° C.; Δn = 0.103; Δε = 13.2; η 19.9 mPa · s; VHR = 92.5%.

Example 6

| | | |
|---|---|---|
| 2-HHXB(F)—F | (1-2-1) | 5% |
| 3-HHXB(F)—F | (1-2-1) | 10% |
| 2-HHXB(F)—OCF3 | (1-2-2) | 5% |
| 3-HHXB(F)—OCF3 | (1-2-2) | 10% |
| 3-HB(F, F)—C | (2-3) | 10% |
| 1V2-BEB(F, F)—C | (2-5) | 3% |
| 3-HH-4 | (3-1-1) | 10% |
| 5-HH—VFF | (3-1-2) | 14% |
| VFF—HHB-1 | (3-2-3) | 6% |
| 5-HBB(F)B-2 | (3-3-4) | 3% |
| 2-HHB(F)—F | (4-2-1) | 3% |
| 3-HHB(F)—F | (4-2-1) | 3% |
| 5-HHB(F)—F | (4-2-1) | 3% |
| V-HHB(F)—F | (4-2-1) | 3% |
| 2-H2HB(F)—F | (4-2-2) | 3% |
| 3-HH2B(F)—F | (4-2-3) | 3% |
| 3-HHEB(F)—F | (4-2-4) | 3% |
| 5-HB—CL | (4-3-6) | 3% |

NI = 80.0° C.; $T_c$ < −30° C.; Δn = 0.084; Δε = 13.1; η = 19.5 mPa · s; VHR = 92.3%.

Example 7

| | | |
|---|---|---|
| 3-BB(F, F)XB(F, F)—F | (1-3-1) | 10% |
| 3-BB(F, F)XB(F)—F | (1-3-2) | 10% |
| 3-HB—C | (2-1) | 20% |
| 5-BEB(F, F)—C | (2-5) | 3% |
| 3-HH-4 | (3-1-1) | 10% |
| 5-HH—VFF | (3-1-2) | 18% |

-continued

| | | |
|---|---|---|
| 1O1-HBBH-3 | (3-3-2) | 3% |
| 1O1-HBBH-4 | (3-3-2) | 6% |
| 1O1-HBBH-5 | (3-3-2) | 6% |
| 3-HHB—OCF3 | (4-3-3) | 3% |
| 3-HH2B—OCF3 | (4-3-4) | 3% |
| 3-HHEB—F | (4-3-b) | 4% |
| 5-HHEB—F | (4-3-5) | 4% |

NI = 84.7° C.; $T_c$ < −30° C.; $\Delta n$ = 0.109; $\Delta\epsilon$ = 13.5; $\eta$ = 20.0 mPa · s; VHR = 92.8%.

Example 8

| | | |
|---|---|---|
| 2-HHXB(F)—F | (1-2-1) | 5% |
| 3-HHXB(F)—F | (1-2-1) | 10% |
| V2-HB—C | (2-1) | 7% |
| 1V2-HB—C | (2-1) | 7% |
| 1V2-BEB(F, F)—C | (2-5) | 4% |
| 3-HH-4 | (3-1-1) | 5% |
| 5-HH—VFF | (3-1-2) | 20% |
| 3-HHB-1 | (3-2-1) | 4% |
| 3-HHB(F, F)—F | (4-1-1) | 3% |
| 3-H2BB(F, F)—F | (4-1-3) | 3% |
| 3-HHXB(F, F)—F | (4-1-4) | 3% |
| 3-HHEB(F, F)—F | (4-1-5) | 3% |
| 3-HHB(F)—F | (4-2-1) | 4% |
| 5-HHB(F)—F | (4-2-1) | 3% |
| 3-HH2B(F)—F | (4-2-3) | 4% |
| 3-HHB—F | (4-3-1) | 3% |
| 3-HHB—CL | (4-3-2) | 6% |
| 7-HB-1 | (4-4-1) | 3% |
| 3-HB—O2 | (4-4-2) | 3% |

NI = 84.0° C.; $T_c$ < −30° C.; $\Delta n$ = 0.092; $\Delta\epsilon$ = 11.6; $\eta$ = 17.7 mPa · s; VHR = 92.5%

Example 9

| | | |
|---|---|---|
| 3-HHXB(F)—F | (1-2-1) | 10% |
| 3-HHXB(F)—OCF3 | (1-2-2) | 6% |
| 3-BB(F, F)XB(F, F)—F | (1-3-1) | 5% |
| 3-HB(F, F)—C | (2-3) | 8% |
| 1V2-BEB(F, F)—C | (2-5) | 3% |
| 5-HH—VFF | (3-1-2) | 20% |
| 3-HHB-1 | (3-2-1) | 3% |
| V-HHB-1 | (3-2-1) | 9% |
| 1O1-HBBH-4 | (3-3-2) | 4% |
| 1O1-HBBH-5 | (3-3-2) | 4% |
| 2-HBB(F)—F | (4-2-5) | 3% |
| 3-H2BB(F)—F | (4-2-6) | 3% |
| 3-HHB(F)—OCF3 | (4-2-7) | 3% |
| 3-HB(F, F)B(F)—F | (4-2-8) | 3% |
| 3-HHB—CL | (4-3-2) | 3% |
| 5-HB—CL | (4-3-6) | 10% |
| 3-HB(F)EB—OCF3 | (4-3-7) | 3% |

NI = 80.2° C.; $T_c$ < −30° C.; $\Delta n$ = 0.100; $\Delta\epsilon$ = 14.0; $\eta$ = 21.0 mPa · s; VHR = 92.2%.

Example 10

| | | |
|---|---|---|
| 3-HXB(F)—OCF3 | (1-1-3) | 7% |
| 3-HHXB(F)—OCF3 | (1-2-2) | 7% |
| 3-HB—C | (2-1) | 28% |
| 3-HH-4 | (3-1-1) | 10% |
| 5-HH—V | (3-1-1) | 14% |
| 1O1-HBBH-3 | (3-3-2) | 3% |
| 1O1-HBBH-4 | (3-3-2) | 5% |

-continued

| | | |
|---|---|---|
| 1O1-HBBH-5 | (3-3-2) | 5% |
| 5-BB(F)B-2 | (3-3-4) | 3% |
| 3-GHB(F, F)—F | (4-1-6) | 2% |
| 3-HGB(F, F)—F | (4-1-7) | 2% |
| 3-H2GB(F, F)—F | (4-1-8) | 2% |
| 3-HBB(F, F)—F | (4-1-9) | 3% |
| 3-H2BB(F, F)—F | (4-1-10) | 3% |
| 3-HBEB(F, F)—F | (4-1-11) | 3% |
| 3-HB(F)B(F, F)—F | (4-1-12) | 3% |

NI = 83.9° C.; $T_c$ < −30° C.; $\Delta n$ = 0.106; $\Delta\epsilon$ = 10.8; $\eta$ = 20.3 mPa · s; VHR = 92.9%.

Example 11

| | | |
|---|---|---|
| 5-HXB(F, F)—F | (1-1-1) | 2% |
| 3-HXB(F)—F | (1-1-2) | 2% |
| 3-HXB(F)—OCF3 | (1-1-3) | 2% |
| 3-BB(F, F)XB(F, F)—F | (1-3-1) | 3% |
| 3-BB(F, F)XB(F)—F | (1-3-2) | 3% |
| 3-BB(F, F)XB(F)—OCF3 | (1-3-3) | 3% |
| 3-HB(F, F)—C | (2-3) | 10% |
| 1V2-BEB(F, F)—C | (2-5) | 3% |
| 3-HH-4 | (3-1-1) | 6% |
| 5-HH—V | (3-1-1) | 18% |
| 5-HH—VFF | (3-1-2) | 5% |
| 1O1-HBBH-3 | (3-3-2) | 5% |
| 1O1-HBBH-4 | (3-3-2) | 5% |
| 1O1-HBBH-5 | (3-3-2) | 5% |
| 3-HB(F)B(F, F)—F | (4-1-12) | 3% |
| 2-HHB(F)—F | (4-2-1) | 3% |
| 3-HHB(F)—F | (4-2-1) | 3% |
| 5-HHB(F)—F | (4-2-1) | 3% |
| V-HHB(F)—F | (4-2-1) | 3% |
| 3-HH2B(F)—F | (4-2-3) | 3% |
| 3-HHB—CL | (4-3-2) | 5% |
| 3-HHEB—F | (4-3-5) | 5% |

NI = 81.5° C.; $T_c$ < −30° C.; $\Delta n$ = 0.093; $\Delta\epsilon$ = 13.5; $\eta$ = 20.5 mPa · s; VHR = 92.2%.

Example 12

| | | |
|---|---|---|
| 5-HXB(F, F)—F | (1-1-1) | 3% |
| 3-HXB(F)—F | (1-1-2) | 3% |
| 3-HXB(F)—OCF3 | (1-1-3) | 3% |
| 3-HHXB(F)—F | (1-2-1) | 5% |
| 3-HHXB(F)—OCF3 | (1-2-2) | 5% |
| 3-BB(F, F)XB(F, F)—F | (1-3-1) | 2% |
| 3-BB(F, F)XB(F)—F | (1-3-2) | 2% |
| 3-BB(F, F)XB(F)—OCF3 | (1-3-3) | 2% |
| 3-HB(F)—C | (2-2) | 13% |
| 5-HH—V | (3-1-1) | 18% |
| 3-HHB-1 | (3-2-1) | 3% |
| 3-HHB—O1 | (3-2-2) | 3% |
| VFF—HHB-1 | (3-2-3) | 5% |
| 1O1-HBBH-4 | (3-3-2) | 5% |
| 1O1-HBBH-5 | (3-3-2) | 5% |
| 3-HHXB(F, F)—F | (4-1-4) | 3% |
| 2-HHB(F)—F | (4-2-1) | 3% |
| 3-HHB(F)—F | (4-2-1) | 3% |
| 5-HHB(F)—F | (4-2-1) | 3% |
| 2-H2HB(F)—F | (4-2-2) | 3% |
| 3-HH2B(F)—F | (4-2-3) | 3% |
| 5-HB—CL | (4-3-6) | 5% |

NI = 81.5° C.; $T_c$ < −30° C.; $\Delta n$ = 0.089; $\Delta\epsilon$ = 10.6; $\eta$ = 19.1 mPa · s; VHR = 92.8%.

Example 13

| | | |
|---|---|---|
| 3-HHXB(F)—F | (1-2-1) | 12% |
| 3-BB(F, F)XB(F, F)—F | (1-3-1) | 10% |
| 3-HB(F)—C | (2-2) | 11% |
| 1V2-BEB(F, F)—C | (2-5) | 3% |
| 3-HH-4 | (3-1-1) | 5% |
| 5-HH—V | (3-1-1) | 20% |
| 3-HHB—O1 | (3-2-2) | 3% |
| 1O1-HBBH-3 | (3-3-2) | 4% |
| 1O1-HBBH-4 | (3-3-2) | 5% |
| 1O1-HBBH-5 | (3-3-2) | 5% |
| 3-H2HB(F, F)—F | (4-1-2) | 3% |
| 2-HHB(F)—F | (4-2-1) | 3% |
| 3-HHB(F)—F | (4-2-1) | 3% |
| V-HHB(F)—F | (4-2-1) | 3% |
| 5-HB—CL | (4-3-6) | 8% |
| 1O1-HB—C | (—) | 2% |

NI = 85.4° C.; $T_c$ < −30° C.; $\Delta n$ = 0.097; $\Delta\epsilon$ = 13.2; $\eta$ = 20.3 mPa · s; VHR = 93.1%.

Effects of the Invention

The composition of the present invention satisfies plural characteristics, i.e., a wide temperature range of a nematic phase, a low viscosity, a suitable optical anisotropy, and a large dielectric anisotropy, in a properly balanced manner. The element of the present invention comprises this composition. An AM element of an IPS mode which comprises the composition having a low viscosity, an optical anisotropy of 0.08 to 0.12 and a large dielectric anisotropy has a high voltage holding ratio.

What is claimed is:

1. A liquid crystal composition comprising at least one compound selected from the group of compounds represented by formulas (1-1), (1-2), and (1-3) as a first component, at least one compound selected from the group of compounds represented by formula (2) as a second component, and at least one compound selected from the group of compounds represented by formulas (3-1), (3-2), and (3-3) as a third component:

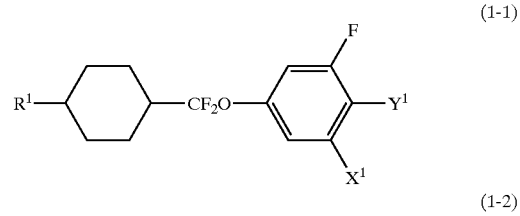
(1-1)

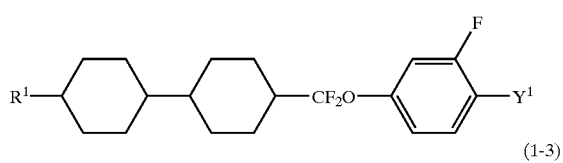
(1-2)

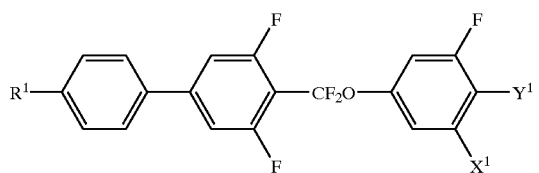
(1-3)

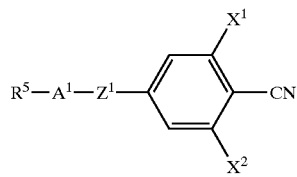
(2)

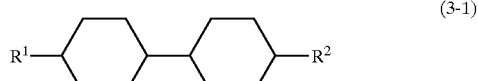
(3-1)

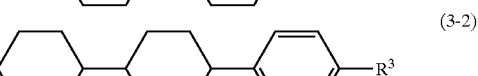
(3-2)

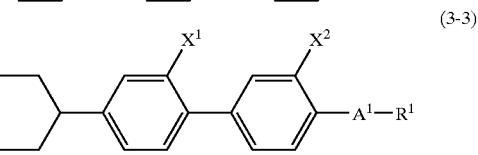
(3-3)

wherein, $R^1$ is alkyl; $R^2$ is alkyl or alkenyl in which one or more hydrogens may be replaced by fluorine; $R^3$ is alkyl or alkoxy; $R^4$ is alkyl or alkoxymethyl; $R^5$ is alkyl or alkenyl; $A^1$ is 1,4-cyclohexylene or 1,4-phenylene; $Z^1$ is a single bond or —COO—; $X^1$ and $X^2$ are independently hydrogen or fluorine; and $Y^1$ is fluorine or —OCF$_3$.

2. The liquid crystal composition according to claim 1, wherein the first component is at least one compound selected from the group of compounds represented by formula (1-1).

3. The liquid crystal composition according to claim 1, wherein the first component is at least one compound selected from the group of compounds represented by formula (1-1) and at least one compound selected from the group of compounds represented by formula (1-2).

4. The liquid crystal composition according to claim 1, wherein the first component is at least one compound selected from the group of compounds represented by formula (1-1) and at least one compound selected from the group of compounds represented by formula (1-3).

5. The liquid crystal composition according to claim 1, wherein the first component is at least one compound selected from the group of compounds represented by formula (1-1), at least one compound selected from the group of compounds represented by formula (1-2), and at least one compound selected from the group of compounds represented by formula (1-3).

6. The liquid crystal composition according to claim 1, wherein the first component is at least one compound selected from the group of compounds represented by formula (1-2).

7. The liquid crystal composition according to claim 1, wherein the first component is at least one compound selected from the group of compounds represented by formula (1-2) and at least one compound selected from the group of compounds represented by formula (1-3).

8. The liquid crystal composition according to claim 1, wherein the first component is at least one compound selected from the group of compounds represented by formula (1-3).

9. The liquid crystal composition according to claim 1 which comprises from 5 to 50% by weight of the first component, from 5 to 40% by weight of the second component, and from 10 to 70% by weight of the third component, each based on the total weight of the composition.

10. The liquid crystal composition according to claim 1 which further comprises at least one compound selected from the group of compounds represented by formulas (4-1), (4-2), (4-3), and (44) as a fourth component:

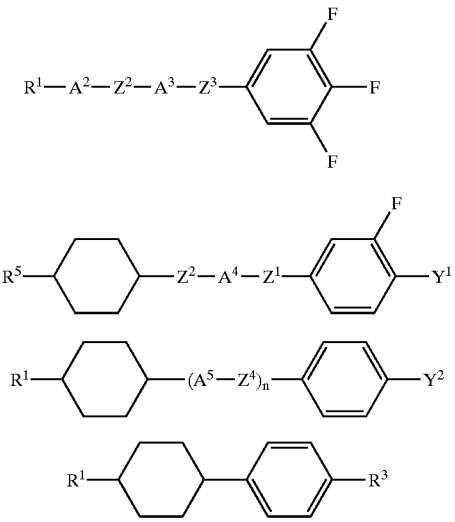

(4-2)

(4-3)

(4-4)

wherein, $R^1$ is alkyl, $R^5$ is alkyl or alkoxy; $R^5$ is alkyl or alkenyl; $A^2$ is 1,4-cyclohexylene or 1,3-dioxane-2,5-diyl; $A^3$ is 1,4-cyclohexylene, 1,4-phenylene, 1,3-dioxane-2,5-diyl, or 3-fluoro-1,4-phenylene; $A^4$ is 1,4-cyclohexylene, 1,4-phenylene, or 3,5-difluoro-1,4-phenylene; $A^5$ is 1,4-cyclohexylene or 3-fluoro-1,4-phenylene; $Z^1$ is a single bond or —COO—; $Z^2$ is a single bond or —(CH$_2$)$_2$—; $Z^3$ is a single bond, —COO—, —(CH$_2$)$_2$—, or —CF$_2$O—; $Z^4$ is a single bond, —COO—, or —(CH$_2$)$_2$—; $Y^1$ is fluorine or —OCF$_3$; $Y^2$ is fluorine, chlorine, or —OCF$_3$; and n is 0 or 1.

11. The liquid crystal composition according to claim 9 which further comprises at least one compound selected from the group of compounds represented by formulas (4-1), (4-2), (4-3), and (4-4) as a fourth component:

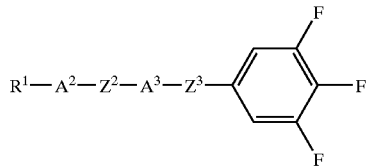

-continued

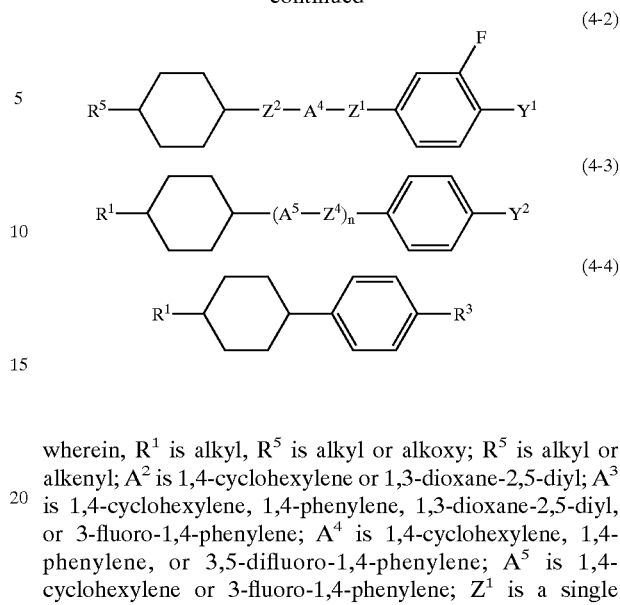

wherein, $R^1$ is alkyl, $R^5$ is alkyl or alkoxy; $R^5$ is alkyl or alkenyl; $A^2$ is 1,4-cyclohexylene or 1,3-dioxane-2,5-diyl; $A^3$ is 1,4-cyclohexylene, 1,4-phenylene, 1,3-dioxane-2,5-diyl, or 3-fluoro-1,4-phenylene; $A^4$ is 1,4-cyclohexylene, 1,4-phenylene, or 3,5-difluoro-1,4-phenylene; $A^5$ is 1,4-cyclohexylene or 3-fluoro-1,4-phenylene; $Z^1$ is a single bond or —COO—; $Z^2$ is a single bond or —(CH$_2$)$_2$—; $Z^3$ is a single bond, —COO—, —(CH$_2$)$_2$—, or —CF$_2$O—; $Z^4$ is a single bond, —COO—, or —(CH$_2$)$_2$—; $Y^1$ is fluorine or —OCF$_3$; $Y^2$ is fluorine, chlorine, or —OCF$_3$; and n is 0 or 1.

12. The liquid crystal composition according to claim 10 which comprises from 1 to 50% by weight of the fourth component, based on the total weight of the composition.

13. The liquid crystal composition according to claim 11 which comprises from 1 to 60% by weight of the fourth component, based on the total weight of the composition.

14. A liquid crystal display element comprising the liquid crystal composition according to any one of claims 1 to 13.

15. The liquid crystal display element according to claim 14, wherein the liquid crystal display element is an AM element of an IPS mode.

* * * * *

UNITED STATES PATENT AND TRADEMARK OFFICE
CERTIFICATE OF CORRECTION

PATENT NO. : 6,887,532 B2
DATED : May 3, 2005
INVENTOR(S) : Okabe et al.

It is certified that error appears in the above-identified patent and that said Letters Patent is hereby corrected as shown below:

Column 5,
Line 55, change "$Z^3$" to -- $Z^1$ --.

Column 29,
Line 4, change "(44)" to -- (4-4) --.

Lines 5-11, replace " 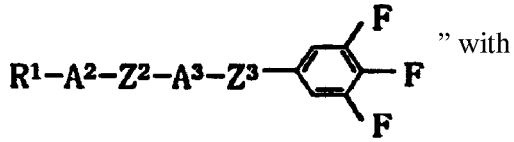 " with

-- 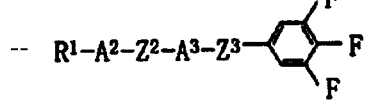 (4-1) --.

Line 28, after "alkyl," and before "is" change "$R^5$" to -- $R^3$ --.

Lines 43-50, replace " 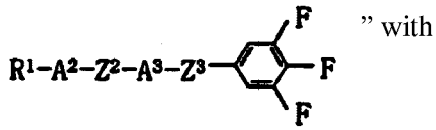 " with

-- 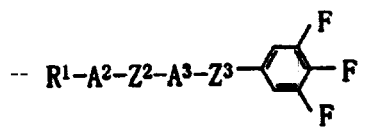 (4-1) --.

UNITED STATES PATENT AND TRADEMARK OFFICE
CERTIFICATE OF CORRECTION

PATENT NO. : 6,887,532 B2
DATED : May 3, 2005
INVENTOR(S) : Okabe et al.

It is certified that error appears in the above-identified patent and that said Letters Patent is hereby corrected as shown below:

Column 30,
Line 19, after "alkyl," and before "is" change "$R^5$" to -- $R^3$ --.
Line 38, change "60%" to -- 50% --.

Signed and Sealed this

Twenty-second Day of November, 2005

JON W. DUDAS
*Director of the United States Patent and Trademark Office*